(12) United States Patent
Pittman

(10) Patent No.: US 6,309,000 B1
(45) Date of Patent: Oct. 30, 2001

(54) ARTICLE CARRIER

(75) Inventor: Jerry Pittman, Chariton, IA (US)

(73) Assignee: Arlen Sturm, Reseda, CA (US)

( * ) Notice: Subject to any disclaimer, the term of this patent is extended or adjusted under 35 U.S.C. 154(b) by 0 days.

(21) Appl. No.: 09/548,889

(22) Filed: Apr. 13, 2000

Related U.S. Application Data

(60) Provisional application No. 60/167,317, filed on Nov. 24, 1999.

(51) Int. Cl.[7] ............................. B65G 7/12; B66F 11/00
(52) U.S. Cl. ........................... 294/15; 294/26; 294/168; 294/169
(58) Field of Search ................... 294/15, 26, 32, 294/67.2, 67.21, 168, 169; 280/47.18

(56) References Cited

U.S. PATENT DOCUMENTS

| | | | |
|---|---|---|---|
| D. 349,437 | * | 8/1994 | Mock et al. ........................... 294/15 |
| D. 402,468 | * | 12/1998 | Killins ................................. D3/315 |
| 454,174 | * | 6/1891 | Martin et al. ......................... 294/15 |
| 539,851 | * | 5/1895 | Bedford ................................ 294/15 |
| 3,074,085 | * | 1/1963 | Salzman ............................. 294/168 |
| 3,761,107 | * | 9/1973 | Docherty et al. ..................... 294/15 |
| 4,094,391 | * | 6/1978 | Ratchford ............................ 294/26 |
| 4,190,278 | * | 2/1980 | Jancik, Jr. ............................. 294/15 |
| 4,641,874 | * | 2/1987 | Grenzer ................................ 294/15 |

* cited by examiner

Primary Examiner—Dean J. Kramer
(74) Attorney, Agent, or Firm—Slaughter & Rosenb; Marshall E. Rosenb

(57) ABSTRACT

An article carrier with an adjustable cradle portion for receiving and supporting articles having various thicknesses, and a handle portion having multiple hand-hold portions for accommodating users of various heights. According to one embodiment the article carrier has a ladder-type construction employing lightweight and rigid members, which can be folded for ease of transport and storage.

12 Claims, 2 Drawing Sheets

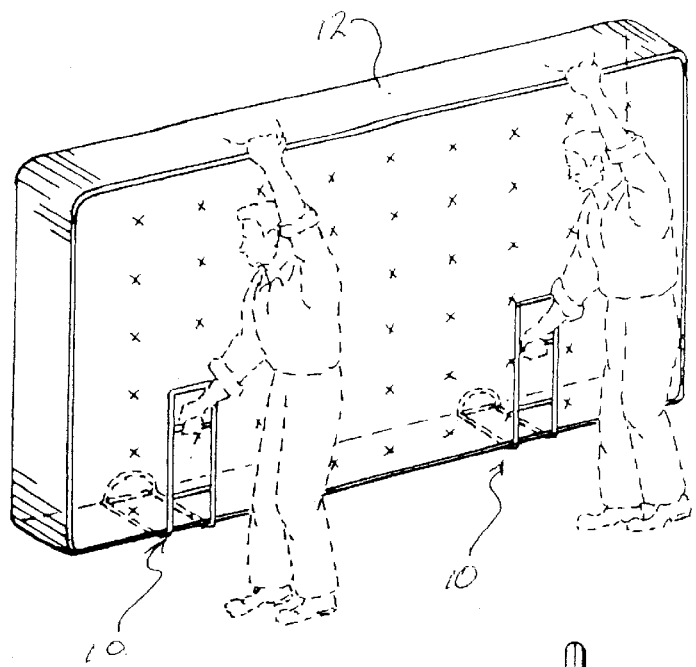
Fig. 1
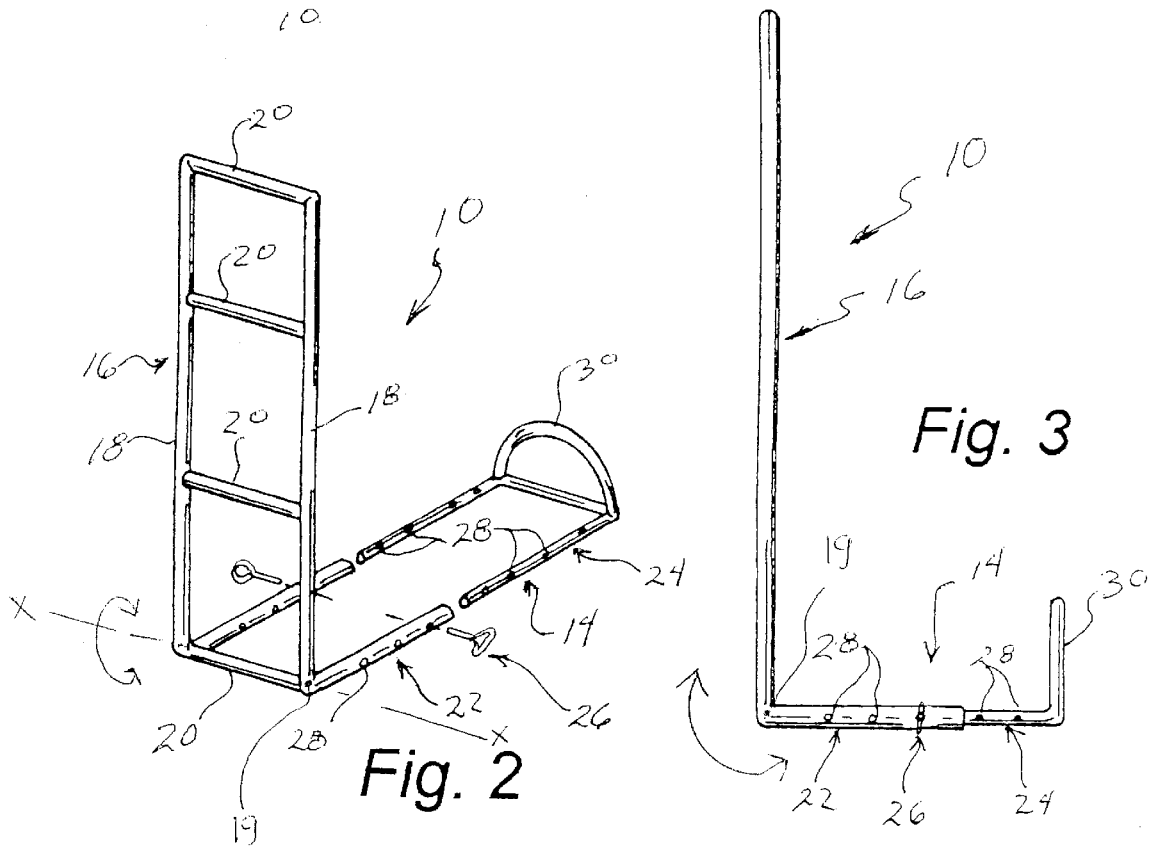
Fig. 2
Fig. 3

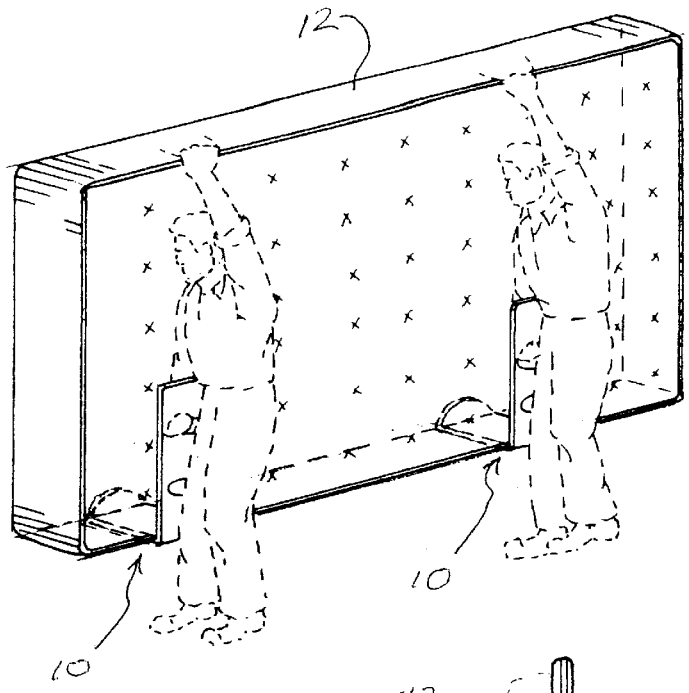
Fig. 4
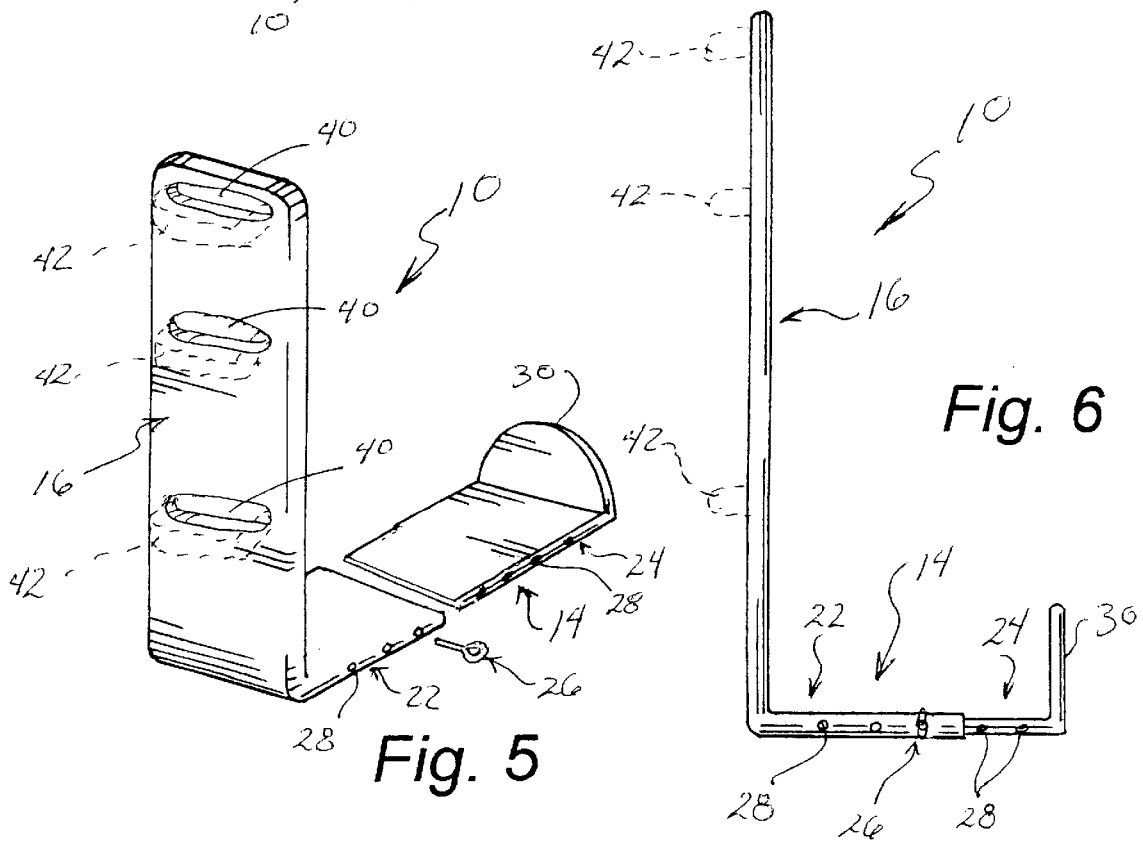
Fig. 5
Fig. 6

# ARTICLE CARRIER

CROSS REFERENCE TO RELATED APPLICATIONS

This application claims the benefit of U.S. Provisional Application No. 60/167,317, filed Nov. 24, 1999.

BACKGROUND OF THE INVENTION

1. Field of the Invention

This invention relates generally to devices used to assist in carrying articles and more particularly to a hand-held article carrier.

2. Description of the Related Art

There are a number of devices, such as those disclosed in U.S. Pat. No. 4,953,904; U.S. Pat. No. Des. 317,703; and U.S. Pat. No. Des. 351,769, that have been designed to assist individuals in carrying articles such as mattresses, drywall or sheetrock, plywood and other large articles that are awkward to carry and move due to their large size, and lack of a suitable handle or hand-hold.

Unfortunately, none of these devices allow the cradle portion of the carrier to be adjustable to accommodate multiple articles or different thicknesses of articles while at the same time allowing for multiple hand-hold positions to accommodate different carrying heights. For example, mattresses may vary in thickness from six inches to twelve inches. Currently available mattress carriers such as the type disclosed in U.S. Pat. No. 4,953,904 do not allow the cradle portion of the mattress carrier to be adjustable to receive different mattress thicknesses. If the width of the mattress carrier is made to accommodate a twelve inch thick mattress, and the mattress to be carried is only six inches thick, then the mattress will tend to move or slide within the carrier cradle which may cause the individuals carrying the mattress to lose their balance or to inadvertently drop the mattress. Additionally, if two or more individuals are carrying the mattress or some other article, it is desirable that the mattress or article be carried substantially level. If these individuals are of different height or arm length, the end of the mattress or article carried by the taller individual will be higher than the end of the article carried by the shorter individual, and again the mattress or article will tend to slide or move within the carrier cradle. To overcome this tendency to slide or move, the shorter individual must attempt to raise his end higher by lifting the carrier upward or the taller individual must lean down. This is difficult to do and may cause muscle strain in the arms or backs of the movers, especially if the article is heavy. It is much more desirable, safer and easier for movers to be able to carry articles with their arms fully extended. Therefore, in order to accommodate differing heights and arm lengths of movers it is desirable to have a carrier with multiple hand hold positions. The carrier disclosed in U.S. Pat. No. Des. 349,437 apparently attempts to resolve this problem by allowing the handle of the carrier to be selectively raised or lowered through the use of an adjustable handle extension member. Unfortunately, such a design does not readily allow the mover to change hand-hold positions while the article is being moved. Additionally, the device requires the user to thread and unthread wingnuts onto multiple bolts extending through apertures spaced along the length of two slidably engaging members. Such an adjustment is time consuming and there is the potential that the article may be scratched or torn by the nuts or bolts Therefore, those concerned with these and other problems recognize the need for an improved article carrier.

BRIEF SUMMARY OF THE INVENTION

An article carrier with an adjustable cradle portion to accommodate and receive various thicknesses of articles and a handle portion with multiple hand-hold positions. The carrier may be made of a number of suitable materials including steel, aluminum, and other light weight, rigid materials such as fiberglass, plastic, or composite materials. The carrier may be made of tubular members secured together to form the cradle and handle portions or, alternatively, the carrier may be molded or extruded forming a single unitary construction. Further, the cradle portion may be hingedly secured to the handle portion to enable the portions to be folded for storage and carrying.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 shows one embodiment of the article carrier of the present invention in use;

FIG. 2 is an exploded perspective view of the article carrier being used in FIG. 1;

FIG. 3 is a side elevation view of the article carrier of FIG. 2;

FIG. 4 shows another embodiment of the article carrier of the present invention in use;

FIG. 5 is an exploded perspective view of the article carrier being used in FIG. 4;

FIG. 6 is a side elevation view of the article carrier of FIG. 5;

DETAILED DESCRIPTION OF THE INVENTION

Referring now to the drawings, wherein like reference numerals designate identical or corresponding parts throughout the several views, FIG. 1 shows the article carrier (10) of the present invention in use cradling an article (12), such as a mattress.

The carrier (10) is comprised of a cradle portion (14) and a handle portion (16) and may be made of any suitable material including steel, aluminum, or other light weight, rigid materials such as fiberglass, plastic, or composite materials.

An exploded perspective view of one embodiment of the carrier (10) is shown in FIG. 2. In this embodiment, the cradle portions (14) and handle portions (16) are constructed of light weight tubular members. As discussed above, the tubular members may be plastic, aluminum, steel, fiberglass or a composite material. FIG. 2 shows the handle portion (16) constructed by vertical members (18) secured together, such as by welding, by a plurality of light weight tubular transverse members (20) spaced along their length. The transverse members (20) act as hand-holds for the article carrier (10). The cradle portion (14) likewise, is comprised of light weight tubular members secured, such as by welding, to one end of the handle portion (16) thereby forming an L-shape when viewed in side elevation, as shown in FIG. 3. Alternatively, instead of separate members secured together, the L-shape could be formed by bending the vertical members (18) to form the L-shape. The cradle portion (14) is preferably adjustable to accommodate articles (12) of varying thicknesses or heights. To accomplish this, the cradle portion (14) is preferably comprised of two mating legs (22, 24), the first leg (22) slidably receiving the second leg (24). The two legs (22, 24) may be locked together in fixed relation by any number of locking devices (26), such as by pull-pins, biased push-buttons, butterfly nuts, locking rings (such as the type often found on adjustable extension poles), etc. The preferred embodiment of FIG. 2, shows the locking device (26) comprising pull-pins which extend through apertures (28) spaced along the lengths of the first and second legs (22, 24) of the cradle portion (14). The second leg (24) of the cradle portion (14) also includes a verticaily extending lip (30) to prevent the article (12) from sliding off the end of the cradle (14).

In an alternate embodiment as shown in FIGS. 4–6, the article carrier (10) is shown as a unitary construction, such as by molding or extrusion, as opposed to individual tubular members welded together. In this embodiment, the handle portion (16) includes large elongated apertures (40) formed therein for the hand-holds. Alternatively, instead of apertures (40), projecting handles (42) (shown in hidden lines in FIGS. 5 and 6) may formed onto the back side of the handle portion (16). Similar to the previous embodiment, the cradle portion (14) is comprised of a first leg (22) which slidably receives a second leg (24) such that the cradle portion (14) is adjustable to accommodate articles (12) of varying thicknesses or heights. As discussed previously, the two legs (22, 24) may be locked together in fixed relation by any number of locking devices (26), such as by pull-pins, biased push-buttons, butterfly nuts, locking rings (such as the type often found on adjustable extension poles), etc. The embodiment of FIG. 5, shows the locking device (26) comprising pull-pins which extend through apertures (28) spaced along the lengths of the first and second legs (22, 24) of the cradle portion (14). The second leg (24) of the cradle portion (14) also includes a vertically extending lip (30) to prevent the article (12) from sliding off the end of the cradle (14).

Although not shown in the drawings, the cradle portion (14) of the article carrier (10) may be hingedly secured to the handle portion (16) by a hinge 19 acting about axis X—X to enable the portions to be folded flat for storage and easier carrying. Likewise, the lip (30) of the cradle portion (14) may also be hingedly secured to the second leg (24) to allow the carrier (10) to be folded flat.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. An article carrier for carrying articles of variable thickness, comprising:
    a handle portion;
    an article cradle portion supported by the handle portion, the article cradle portion having a first support portion supported by a second support portion at a desired width to support an article having a thickness, the second support portion secured to a vertical extent of the handle portion; and
    a lip portion extending generally upwardly from the first support portion, wherein the article to be carried is received and supported in the space defined by the vertical extent of the handle portion, the first support portion, the second support portion and the lip portion receiving the article;
    wherein each of the first support portion and the second support portion are formed of a rectangular open frame each having first and second hollow members having legs, the free ends of the legs of each hollow member of the first support portion telescopically fitting within the corresponding free ends of the corresponding legs of the second support portion.

2. The article carrier as recited in claim 1, further comprising a plurality of handhold grips provided along a vertical extent of the handle portion.

3. The article carrier as recited in claim 1, wherein the lip portion and the article cradle portion are formed as an integral unit.

4. The article carrier as recited in claim 1, wherein the first support portion is secured to the second portion at a lateral position between the handle portion and the lip portion by a locking device.

5. The article carrier as recited in claim 4, wherein the locking device is secured to one of a plurality of preselected locking positions arrayed along the lateral extent of the article cradle portion.

6. The article carrier as recited in claim 4, wherein the locking device is selected from the group including pull-pins, biased push-buttons, butterfly nuts, and locking rings.

7. The article carrier as recited in claim 1, wherein the article cradle portion is hingedly secured to the handle portion.

8. An article carrier for carrying articles of variable thickness, comprising:
    a handle portion;
    an article cradle portion supported by the handle portion, the article cradle portion having a first support portion supported by a second support portion at a desired width to support an article having a thickness, the second support portion secured to a vertical extent of the handle portion;
    a lip portion extending generally upwardly from the first support portion, wherein the article to be carried is received and supported in the space defined by the vertical extent of the handle portion, the first support portion, the second support portion and the lip portion receiving the article; and
    a plurality of handhold grips provided along a vertical extent of the handle portion;
    wherein the handle portion is formed of a rectangular open frame, and a plurality of transverse members secured thereto.

9. An article carrier for carrying articles of variable thickness, comprising:
    a handle portion;
    an article cradle portion supported by the handle portion in a generally L-shaped arrangement, the article cradle portion having a first open frame support portion supported by a second open frame support portion secured to a vertical extent of the handle portion, each of the first support portion and the second support portion being formed of a rectangular open frame each having first and second hollow members having legs, the free ends of the legs of each hollow member of the first support portion telescopically fitting within the corresponding free ends of the corresponding legs of the second support portion and extendable therebetween to accommodate an article having a thickness; and
    a lip portion extending generally upwardly from the first support portion, wherein the article to be carried is received and supported in the space defined by a vertical extent of the handle portion, the first support portion, the second support portion and the lip portion receiving the article.

10. The article carrier as recited in claim 9, further comprising a plurality of handhold grips provided along a vertical extent of the handle portion.

11. The article carrier as recited in claim 10, wherein the handle portion is formed of a rectangular open frame, and a plurality of transverse members secured thereto.

12. The article carrier as recited in claim 9 wherein the first support portion is secured to the second portion at a lateral position between the handle portion and the lip portion by a locking device.

* * * * *